US009382729B2

(12) United States Patent
Ellis et al.

(10) Patent No.: US 9,382,729 B2
(45) Date of Patent: *Jul. 5, 2016

(54) FIRE ACTUATED RELEASE MECHANISM TO SEPARATE ELECTRONIC DOOR LOCK FROM FIRE DOOR

(71) Applicant: Sargent Manufacturing Company, New Haven, CT (US)

(72) Inventors: David D. Ellis, Milford, CT (US); Scott B. Lowder, Orange, CT (US); Rick Leites, Milford, CT (US); Michael J. Lorello, Guilford, CT (US)

(73) Assignee: Sargent Manufacturing Company, New Haven, CT (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/362,957

(22) PCT Filed: Dec. 7, 2012

(86) PCT No.: PCT/US2012/068430

§ 371 (c)(1),
(2) Date: Jun. 5, 2014

(87) PCT Pub. No.: WO2013/086310

PCT Pub. Date: Jun. 13, 2013

(65) Prior Publication Data

US 2014/0318200 A1 Oct. 30, 2014

Related U.S. Application Data

(60) Provisional application No. 61/568,874, filed on Dec. 9, 2011.

(51) Int. Cl.
*E05B 65/00* (2006.01)
*A62C 2/24* (2006.01)

(Continued)

(52) U.S. Cl.
CPC ............... *E05B 65/104* (2013.01); *A62C 2/242* (2013.01); *E05B 65/108* (2013.01); *E05B 2015/1664* (2013.01); *Y10T 70/8946* (2015.04)

(58) Field of Classification Search
CPC .......... A62C 2/00; A62C 2/241; A62C 2/242; A62C 2/245; E05B 65/104; E05B 65/108; E05B 2015/1664; E05B 17/0075; Y10T 70/8946; F16B 31/005
USPC ................ 89/1.14; 52/232; 137/75; 361/103; 16/48.5; 49/1, 2
See application file for complete search history.

(56) References Cited

U.S. PATENT DOCUMENTS 3,889,314 A * 6/1975 McCabe ................ A62C 2/245 16/48.5
3,916,566 A 11/1975 Lacombe (Continued)

*Primary Examiner* — Bret Hayes
(74) *Attorney, Agent, or Firm* — DeLio, Peterson & Curcio LLC; Kelly M. Nowak

(57) ABSTRACT

A release mechanism is actuated by the heat of a fire to electrically and mechanically disconnect electrical wiring from an electronic lock having a plastic housing. The electronic lock is mounted on a fire door and as it is heated by a fire on the opposite side of the fire door, mounts that hold the lock melt, releasing the electronic lock to drop away from the fire door and prevent ignition of the plastic housing. The release mechanism may use shape memory alloy wire to contract and disconnect a ribbon cable. Solder connectors may also be used to disconnect wires. Intumescent material that expands when heated is used to drive the lock mechanism away from the fire door and insulation is used to control the timing of melting.

20 Claims, 6 Drawing Sheets

(51) Int. Cl.
*H02H 5/04* (2006.01)
*E05B 65/10* (2006.01)
*E05B 15/16* (2006.01)

(56) References Cited

U.S. PATENT DOCUMENTS 3,999,790 A 12/1976 Rogen
4,979,383 A 12/1990 Tully
4,986,583 A 1/1991 Campbell et al.
5,245,879 A 9/1993 McKeon
5,312,152 A * 5/1994 Woebkenberg, Jr. .. B64G 1/641 294/82.24
5,344,506 A * 9/1994 DeAngelis .............. B21F 11/00 148/402
6,092,334 A * 7/2000 Kim ........................ E05F 1/006 16/334
8,881,637 B2 * 11/2014 Leites ................... F16B 31/005 137/75
2003/0132829 A1 * 7/2003 Frolov .................... E05B 47/00 340/5.7
2004/0129043 A1 * 7/2004 Squier ....................... E05B 9/08 70/278.1
2007/0132250 A1 * 6/2007 Schnekenburger .... G08B 17/06 292/144
2014/0318200 A1 * 10/2014 Ellis ...................... E05B 65/104 70/465

* cited by examiner

FIRE ACTUATED RELEASE MECHANISM TO SEPARATE ELECTRONIC DOOR LOCK FROM FIRE DOOR

BACKGROUND OF THE INVENTION

1. Field of the Invention

The present invention relates to fire rated electronic door locks that have components made of plastic or other materials having a relatively low ignition temperature. More specifically, the present invention relates to a fire rated electronic door lock that includes a mechanism, actuated by the heat of a fire on the hot side of a fire door, which acts to disconnect wiring from lock components mounted on the cold side of the fire door. By disconnecting wiring from the cold side, the cold side lock components are no longer tethered with wiring to the fire door and can drop away to prevent ignition and improve fire resistance.

2. Description of Related Art

Electronic door locks typically include lock components mounted in housings on opposite sides of the door. These lock components may include card readers, proximity detectors, keypads, LED and LCD displays and indicators, batteries, printed circuit board assemblies, actuators and the like. Many of these electronic lock components incorporate materials made of plastic.

Often the lock housings and escutcheons are made of metal. It would be highly desirable to have the option to make the housings and escutcheons out of plastic instead of metal to reduce cost and increase design flexibility.

A problem with the use of plastic for the housing and with plastic found in common off-the-shelf electronic components is the relatively low ignition temperature of these materials. Many types of plastic will eventually begin to burn if they are exposed to sufficiently high temperatures.

For a fire door, the side of the door exposed to the fire may be referred to as the "hot" side and the opposite side may be referred to as the "cold" side. In order to meet applicable fire codes and standards, a fire rated door and the locks installed thereon must withstand exposure to a fire for a relatively long period of time without allowing the fire to pass through the door.

Although the "cold" side of the fire door is not directly exposed to an open flame during fire rating tests, it is slowly heated to a very high temperature during testing as the heat of the fire on the hot side passes through the fire door. Fire rated doors are most commonly made of metal and the temperature of the fire door on the "cold" side will typically exceed 1000° F. (538° C.) during testing. To meet certain fire test standards, the lock components on the cold side must withstand three hours of exposure to this high temperature without ignition. It is very difficult to meet this standard when the lock components on the cold side are made of plastic.

The high temperature on the cold side easily exceeds the melting and ignition temperatures of many common materials, such as plastics. Due to lower cost and greater design flexibility, plastics would be desirable for use in constructing the lock housing if not for the ignition risk of such materials. The potential for undesirable ignition also limits the design and use of other components in electronic locks, such as common electronic components and mechanical components. As a result, in order to meet fire rating standards for electronic locks installed on fire doors, it has heretofore been necessary to construct the lock housing of metal or other relatively expensive non-flammable, high ignition temperature materials.

The non-flammable housing acts to contain the electrical and other potentially flammable components used in the electronic lock and prevents them from igniting or producing an open flame, which would allow passage of the fire through the fire door. Even with a metal housing, the lock designer is often limited in the choice and positioning of components made of plastic. Although limited amounts of plastic may be used inside the metal housing, it has not previously been possible to make the housing of plastic or to use significant amounts of plastic and other low ignition temperature materials. If such materials are used for the lock housing on the "cold" side of a fire door, there is a significant risk that the heat of the fire will eventually melt and ignite such materials. Ignition of lock components on the "cold" side during fire testing results in failure of the fire certification process.

One method of preventing such ignition is to physically separate the lock components from the surface of the fire door before the ignition temperature is released. This requires, at a minimum, that any mechanical mounting of the lock mechanism to the cold side door surface be released when the fire door is exposed to fire on the hot side so that the lock mechanism can drop away from the heated fire door.

The mechanical mount may be mounting screws, studs, tabs, etc. Typically the lock mechanism will include a mounting plate that is bolted to the cold side of the fire door. A circuit board and the electrical components will be mounted within a housing attached to the base plate. In order to use low ignition temperature materials, such as a plastic housing, it would be desirable to release the housing and circuit board and/or to release the mounting plate during a fire so that all components on the cold side that can be ignited will fall away from the heated fire door before they reach ignition temperature.

For electronic locks, however, it is not sufficient merely to disconnect the mechanical lock mounting. Electronic locks include a circuit board and/or other components of the lock that are electrically connected to the rest of the lock system. The electrical connections are typically made with copper wires, such as a ribbon cable or with individual wires. Copper has a relatively high melting point. The electrical wires act to tether the lock mechanism and form an additional mechanical connection between the lock mechanism and the fire door. This additional connection must also be released if the lock mechanism is to be allowed to drop away and physically separate from the fire door.

A need exists in the art for improved electronic door lock designs that are fire rated wherein lower cost materials, such as various types of plastic, can be used for the housing and used in greater quantities for other lock components. Plastics and other compounds having a relatively low ignition temperature can provide more flexible design options than metal.

The term "low ignition temperature" as used herein refers to a sufficiently low ignition temperature that there is a significant risk of ignition when the material is exposed to heat on the cold side of a fire door during fire testing in which the heat from a fire is applied to the hot side of the fire door.

Even if metal is used in the housing on one side of the fire door, the components on the other side must withstand the heat of the fire. Both sides of the lock mechanism must prevent passage of the fire through the fire door as a fire can occur on either side.

Because plastics are widely used in electronic components, such as in sensors, relays, connectors, integrated circuit packaging and the like, an electronic lock design which separates the lock from the fire door during a fire allows greater quantities of plastic to be used, such as in card readers, proximity sensors, motor housings, display indicators, etc. without risk of ignition.

It will be noted that the terms "door lock" and "lock mechanism" and the like, as used herein, refer to the electronic control portion of a door lock or other door hardware intended to be mounted on a fire door. The door lock mechanism may include keypads, proximity detectors, card readers, display lights, batteries, printed circuit board assemblies, control systems for reporting events to a central lock system, wireless transmitters, receivers and the like, all of which are mounted on a fire door in a housing. All of these electronic components are included within the scope of the terms "door lock" and "lock mechanism" and the like as used herein.

Conventional mechanical door lock components, such as handles, pushbars, key cylinders, turn knobs, latch bolts, dead bolts, guard bolts, locking assemblies, etc. may all be separate from the door lock mechanism referred to here. The door lock mechanism of this invention may control a mortise lock, cylindrical lock, bored lock, exit device or other fire door hardware and may be integrated therewith or may be completely separate therefrom.

Generally, the mechanical hardware will not present a fire risk as it will be made of metal. Thus, as used herein, the terms above referring to the lock may be interpreted to include only some of the electronic components that control or are mounted with other mechanical lock components.

SUMMARY OF THE INVENTION

Bearing in mind the problems and deficiencies of the prior art, it is therefore an object of the present invention to provide an electronic door lock that uses the heat of a fire to separate at least a portion of the lock mechanism from the fire door.

It is a further object of the present invention to provide an electronic door lock that uses the heat of a fire to disconnect wiring from a lock mechanism to release the mechanical connection formed by the electrical connection between the wiring and the lock mechanism.

Still other objects and advantages of the invention will in part be obvious and will in part be apparent from the specification.

The above and other objects, which will be apparent to those skilled in the art, are achieved in the present invention which is directed in one aspect to an electronic door lock having a release mechanism incorporating shaped memory alloy ("SMA") that contracts when heated. The SMA material provides a fire actuated electrical disconnection. The SMA material is arranged so that the contraction exerts a pulling force on an electrical connector attached to the lock. As the SMA material contracts, the electrical connector is pulled off and the lock mechanism is no longer electrically connected or mechanically connected to any other portion of the lock mechanism.

In an alternative embodiment, the electronic door lock uses a solder sleeve for each electrical wire to achieve the electrical disconnection. The solder in each solder sleeve has a sufficiently low melting temperature that heat from the fire melts the solder to release the wires. The SMA wire electrical disconnection and the solder sleeve electrical disconnection may be used in the alternative, or they may be combined to achieve the desired fire actuated electrical disconnection and thereby produce the required release of the electrical wiring and its associate mechanical connection.

In addition to the fire actuated electrical disconnection aspects of the invention, a fire actuated mechanical disconnection of at least a portion of the electronic lock is also provided. The fire actuated mechanical disconnection allows all the lock components capable of being ignited to fall away from the fire door when the door is exposed to fire on the opposite side.

The fire actuated mechanical disconnection is achieved by mounting the electronic lock, or ignitable portions thereof, to the fire door surface with a meltable mount. The mount may include meltable materials such as plastic tabs, plastic screws, metal screws connected to or through plastic mounts, plastic or fusible rivets or other materials and mounting structures that melt when heated. The meltable mounts disconnect the housing and other ignitable components of the lock from the fire door.

As the fire proceeds, the heat of the fire passes through the fire door and fully actuates both the electrical disconnection of the wiring and the mechanical disconnection of the lock mechanism mounts from the fire door surface. The lock mechanism is then completely released from the fire door and is free to fall away. As the lock mechanism falls away, it separates the ignitable components from the source of ignition—the heated fire door. This separation is sufficient to prevent ignition of the materials that can ignite (plastic lock housing, plastic electronic components, etc.) and prevents the fire from spreading through the fire door.

In one aspect of the invention, a metal mounting plate is used and is attached to the surface of the door. A lock housing, which may be of plastic, is mounted to the mounting plate. The mechanical mount between the mounting plate and the housing is meltable. As the heat of a fire penetrates the fire door, the mounting plate is heated and the mechanical mounting of the lock mechanism is released. The mounting plate remains attached to the fire door. In alternative embodiments, the mounting plate may be made of plastic.

In some embodiments of the invention, the lock is designed so that gravity alone is sufficient to cause the lock housing and ignitable components to fall away from the fire door as the mechanical mount and electrical wire connections are released. In other embodiments of the invention, an intumescent material that expands when heated is used between a portion of the lock and the fire door surface. The expansion of the intumescent material is used to actively push portions of the lock mechanism away from the fire door so that they are free to drop away and provide the desired physical separation from the fire door.

The intumescent material may be in sheet form located between the fire door and the lock components. Other shapes of intumescent material may also be used to provide the force that drives the lock away from the fire door as the intumescent material expands.

It is also contemplated that the meltable mount may comprise a spring released mechanism having a meltable trigger or a thermal fuse which may be used for the fire actuated mechanical release. The spring is held in a compressed state by the thermal fuse. As the thermal fuse melts, the spring acts to release and/or push the lock away from the fire door.

When shape memory alloy (SMA) is used to disconnect the electrical connections, the SMA material is preferably formed as a wire. The SMA wire may be made of a nickel titanium alloy, which is commonly referred to as "nitinol." When heated, nitinol typically contracts by approximately 4% of its length. One end of the wire is fixed relative to the fire door, most preferably to a metal mounting plate that remains attached to the door. The other end of the SMA wire is connected to an electrical connector which makes the electrical connections. As the SMA material is heated by the fire, the wire shrinks and the electrical connector is pulled off a pin header on the circuit board.

For the fire actuated electrical release using SMA material to operate correctly, the SMA wire is oriented so that it exerts a pulling force on an electrical connector parallel to pins received in the connector. This pulls the connector directly off the pins and off the pin header, plug or receptacle mounted on the printed circuit board. To achieve the desired orientation, the SMA wire may be routed around a metal stud, around an edge of the mounting plate or around any other fixed point or points on on the metal mounting plate.

In the most highly preferred design, to maximize the distance that the SMA material pulls the electrical connector, the SMA wire is routed around multiple fixed points or studs. This allows an increase in the length of the SMA wire beyond the maximum dimension of the housing. The distance that the SMA can pull is a percentage of the total length of the SMA wire—typically about four percent. By increasing the length of the SMA wire, the pulling distance is increased, which ensures that the electrical connector will always be fully disconnected from the circuit board in the lock housing.

In another aspect of the invention, the SMA wire is located between a metal mounting plate and the fire door. This ensures that the SMA wire will be quickly heated to release the electrical connector before any significant deformation of the plastic housing or plastic mounts for the electrical circuit board occurs.

Because the connector is disconnected from pins attached to the circuit board, it is important that the pins and circuit board be firmly secured as the SMA wire begins to contract. If the mechanical mount or circuit board has begun to melt, the pulling force provided by the SMA material may cause the connector and pins to move together instead of causing the connector to be pulled off the pins. In yet another aspect of the invention, an insulating material is positioned between the circuit board and the heat source to prevent the circuit board or its mounts from melting or deforming before the SMA disconnection of the connector has been achieved.

In a further aspect of the invention, the SMA material is positioned adjacent to the fire door surface, as between the mounting plate and the fire door, so that heat transfer to the SMA material is maximized.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-10 of the drawings in which like numerals refer to like features of the invention.

Figure 1:
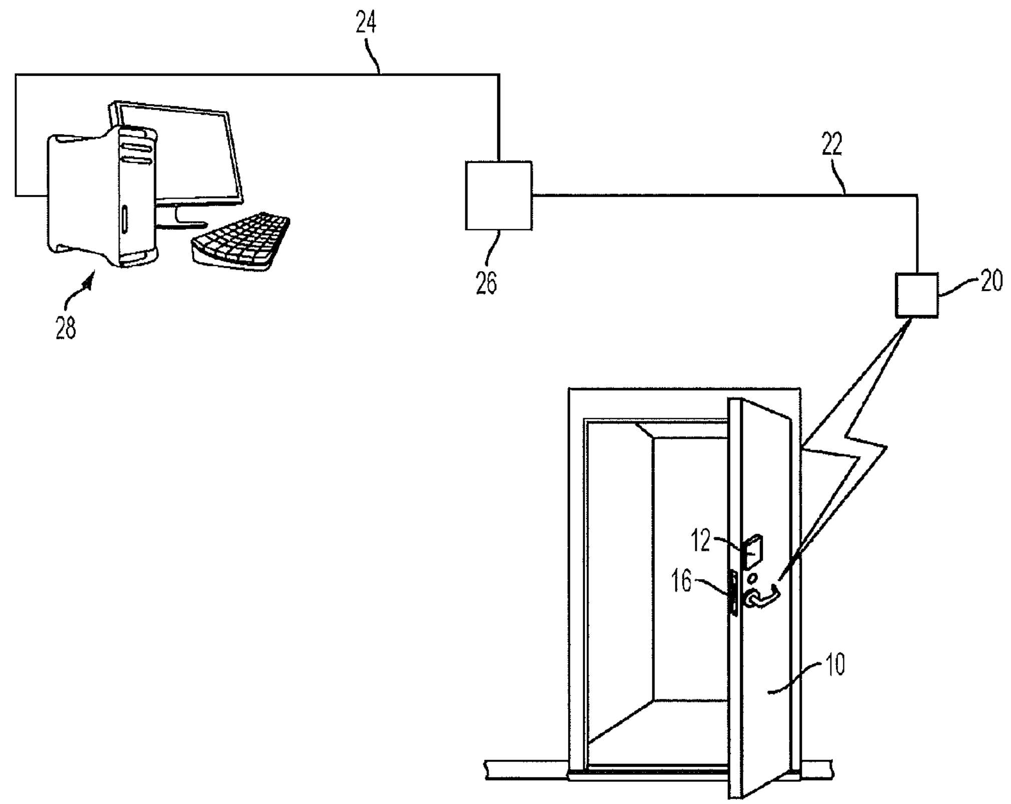
FIG. 1 is a perspective view of an electronic lock system having an electronic lock mechanism according to the present invention mounted on a surface of a fire door. Only one side of the fire door is shown having a reader mounted in a plastic housing. The lock mechanism illustrated is a wireless lock, although wired locks may also be used with this invention.
Figure 2:
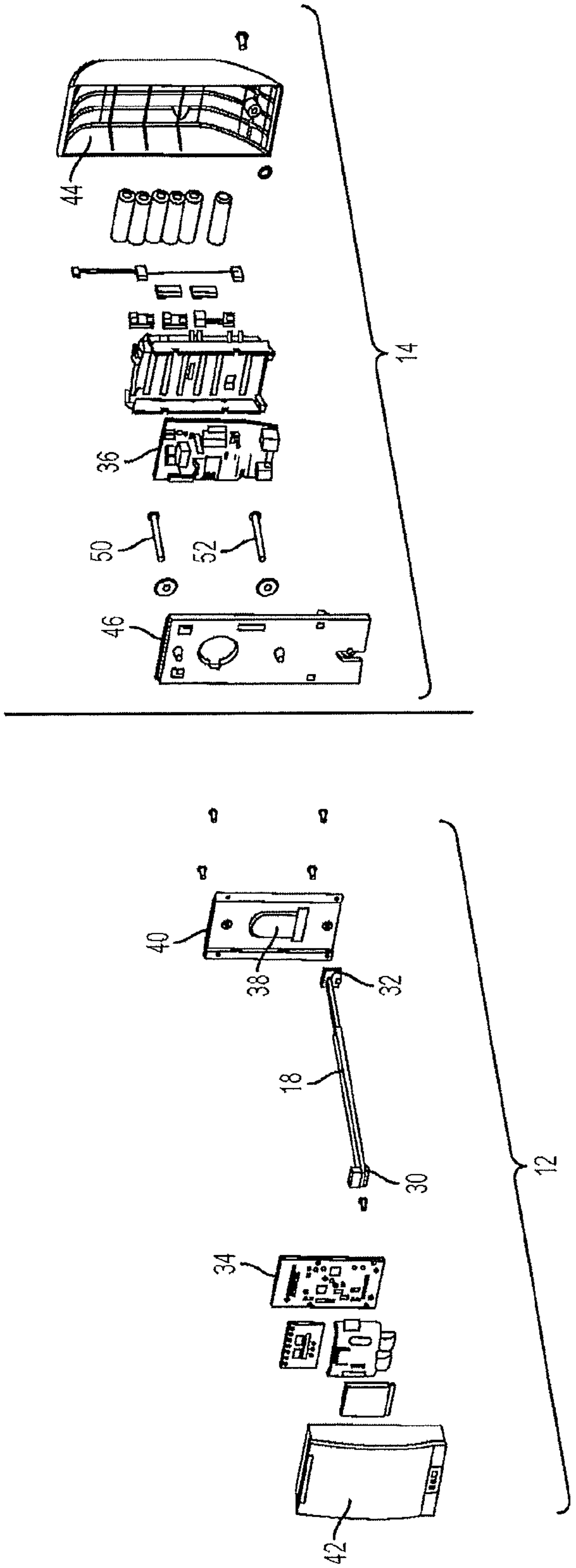
FIG. 2 is an exploded perspective view of an electronic lock mechanism according to one embodiment of the present invention. This view shows two halves of the lock mechanism mounted on opposite sides of the fire door, but does not show details of the electronic or mechanical disconnection mechanisms. It provides an overview of relevant components for reference in the detail views and descriptions of different embodiments below.

Referring to FIGS. 1 and 2, a fire door 10 has an electronic lock 12 mounted on a surface thereof. The lock portion 12 shown in FIG. 1 is electrically connected through the fire door 10 with electrical wires 18 to another portion of the lock 14 (see FIG. 2) located on the back side of the door.

The electronic lock 12, 14 functions to control mortise lock 16. The present invention will be illustrated in connection with a mortise lock design, however, the electronic lock may be used with bored locks, exit devices and other fire door hardware.

The electronic lock 12, 14 is wirelessly connected through wireless access point 20 and is then connected to computer 28 through wires 22 and 24 and other network circuitry 26, which may be hubs, switches, routers or the like, or other custom or off the shelf control hardware. Again, although this invention is illustrated in connection with a wireless control system, it may be implemented with a wired connection, and or other types of non-wired systems, such as infrared or the like.

Referring to FIG. 2, the wiring 18 is illustrated as ribbon wiring with connectors 30 and 32 at opposite ends. Although it is preferred to use ribbon cable in this embodiment, other types of cable and wiring can be used. Connector 30 is connected to a pin header on the back side of circuit board 34 in FIG. 2. The back side of circuit board 34 and the connection between the connector 30 and pin header can be seen in the detail view of FIG. 6.

Depending on the quantity of ignitable material used in portions 12, 14, it may be necessary for only one or for both to be separated from the fire door. In the first embodiment described below, both components are designed so that regardless of which side the fire occurs on, the other component (on the "cold" side) will drop away from the fire door. Thus, plastic can be used for the housing on both sides.

Figure 6:
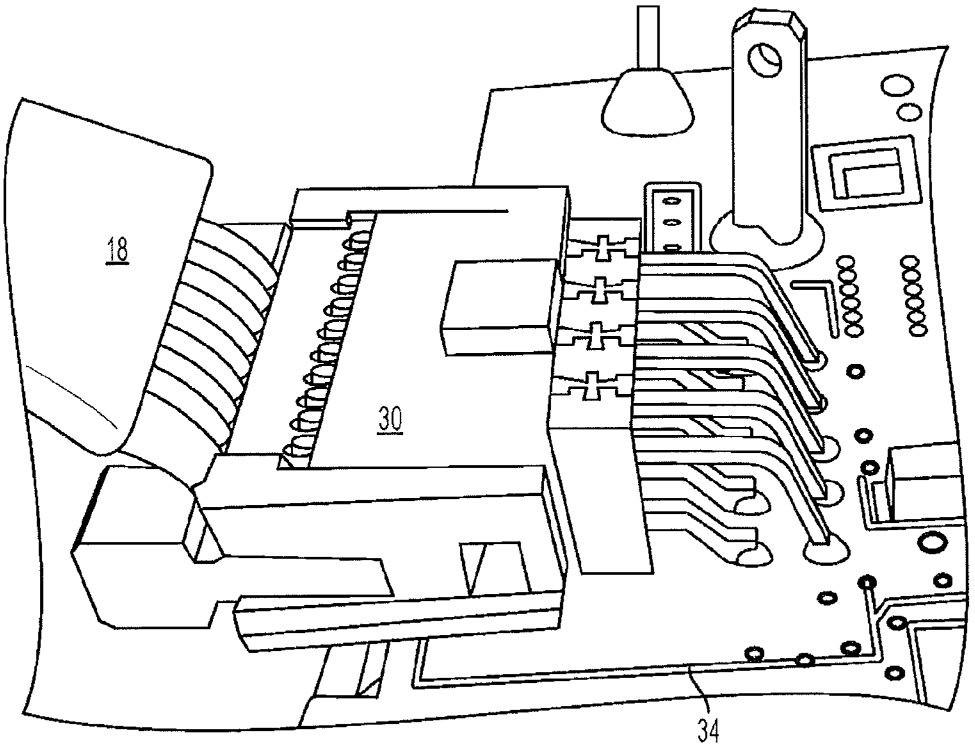
FIG. 6 is a detail view showing the ribbon wire and electrical connector of FIG. 2 connected to circuitry, also seen in FIG. 2. The orientation of the connector, ribbon cable and pins on the circuit board can be seen. The SMA wire is connected to the connector seen here and provides a pull to the left, which is parallel to the pins from the circuit board that the connector receives. This orientation is turned ninety degrees as compared to FIG. 3. The SMA wire pulls down in FIG. 3, which corresponds to the left in FIG. 6.

Note that in FIG. 6 the circuit board and connector are turned ninety degrees from the orientation of FIG. 2. To remove the connector 30 from the pin header, a downward force must be exerted on the connector in FIG. 2, which is to the left in FIG. 6. The circuit board and pin header must remain stationary so that the connector is removed.

Connector 32 is connected to circuit board 36 on the opposite side of the fire door. The ribbon cable 18 passes through opening 38 in mounting plate 40, through the fire door and into the lock portion 14. It has been found that although both components 12 and 14 must be mechanically disconnected from the fire door, it is only necessary to electrically disconnect the ribbon cable 18 at one end. As described below, only the connector 30 will be released.

As the fire door is heated, if the lock housings 42, 44 are made of plastic, the housing on the "cold" side of the door will eventually melt and may ignite. The housing mounts and the mounts for the respective circuit boards may be arranged so that the mechanical connection of the housings, covers and circuit boards are all released by this melting action.

In the design shown in FIG. 2, mounting plate 40 acts as a fire stop and is made of metal. It is through-bolted to the fire door with metal bolts 50, 52. Mounting plate 46 and housing covers 42 and 44 are all of meltable plastic. As they melt in a fire, substantially all of lock portion 14, except for through bolts 50 and 52 will drop away provided that connector 30 is disconnected from circuit board 34. Substantially all of lock portion 12 will also drop away, except for the metal mounting plate 40.

The melting temperature of the plastic used for the housings is sufficiently low that this fire actuated mechanical release of the mounts occurs well before the ignition temperature of any plastic components is reached.

During testing, the temperature of the fire door will slowly rise and will eventually exceed 1000 degrees Fahrenheit for several hours. To receive certification the plastic housings and escutcheons must drop away from the door within 15 minutes. By using metal fasteners that are heated by fire and are connected to meltable plastic, the mechanical mounting and disconnection can be achieved, but it is also necessary to disconnect the electrical wiring.

If the electrical wiring is not disconnected, as the housing drops away, the wiring will act as a tether and hold both sides 12 and 14 with the plastic housings 42, 44 in contact with the heated fire door. Over the period of hours during testing, the plastic in these housings will exceed the ignition temperature.

Figure 3:
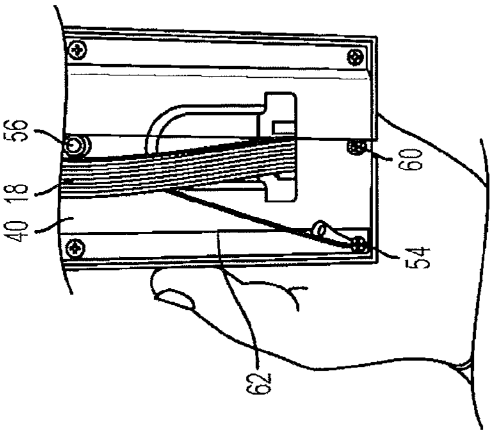
FIG. 3 is a back elevational view of the lower portion of an electronic lock mechanism according to the present invention showing a ribbon electrical cable extending out of the back of the lock and an SMA wire providing fire actuated electrical disconnection according to the present invention. The electrical connector the SMA wire is connected to cannot be seen in this view. The SMA wire passes around two pivot points in this view.

FIG. 3. shows one embodiment of this invention incorporating a solution to this problem. The back of the lock mechanism 12 is shown. The metal mounting plate 40, opening 38 in that plate and ribbon cable 18 from FIG. 2 can all be seen. In addition, however, a shape memory alloy ("SMA") wire 62 is illustrated, which does not appear in FIG. 2.

Figure 5:
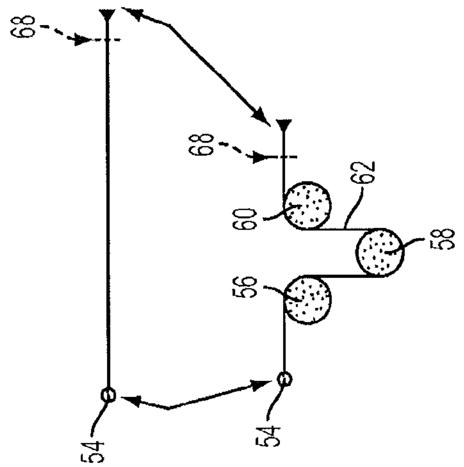
FIG. 5 is also a simplified schematic diagram showing an SMA wire type fire actuated electrical release mechanism routed around multiple pivot points. The SMA wire is shown as it passes around three fixed points so that a longer SMA wire can fit within the confines of a smaller housing. A dashed line indicates the contracted length of the SMA wire when the wire is heated by a fire.

The SMA wire 62 is routed in a winding path around two pivots similar to FIG. 5 (except FIG. 5 shows the option of three pivots). The winding path around pivots allows a longer length of SMA wire to fit within the limited confines of the lock portion 12. The SMA wire is securely attached at one end to the metal mounting plate 40 at point 54 located at the lower left in FIG. 3. The SMA wire then extends upwards and loosely passes around stud 56. The SMA wire is free to slide past stud 56 as it contracts. The SMA wire 62 then proceeds straight down in FIG. 3 to the bottom edge of the plate 40 and passes loosely around and under the bottom of mounting plate 40 at point 60.

The SMA wire in FIG. 3 then proceeds straight up from the bottom edge of plate 40 behind the plate and connects to connector 30 (which cannot be seen in FIG. 3). At a temperature of 200 degrees Fahrenheit, SMA wire contracts by approximately 4%. To disconnect connector 30 from the pin header on circuit board 34 requires a relative motion of approximately 0.1 inches. To ensure disconnection, the SMA wire is 10.0 inches long, which provides a factor of 4 excess and moves connector 30 a distance of 0.4 inches.

Figure 4:
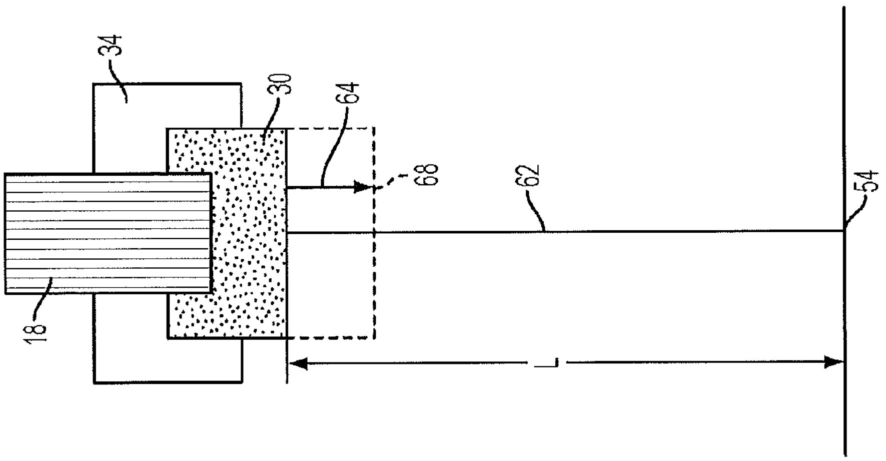
FIG. 4 is a simplified diagram showing an SMA wire connected in a straight path to an electrical connector and the ribbon cable of FIG. 3. The location of the connector after heating of the SMA wire is schematically shown in dashed lines to indicate the actuation distance of the SMA wire.

This is illustrated in simplified form in FIG. 4 where the routing of the SMA wire has been eliminated and the wire is shown as being straight. SMA wire 62 is attached at its end at point 54 and has an initial length "L" of 10.0 inches. Connector 30 is connected to circuit board 34, which is also mounted so that it cannot move. As the SMA wire is heated, it shrinks in length. Connector 30 moves in the direction shown by arrow 64 and at 200 degrees Fahrenheit, it will have moved a distance of 0.4 inches to the location shown in dashed lines. Because only a movement of 0.1 inches is required to disconnect connector 30 from the header pins, the ribbon cable 18 is disconnected from circuit board 34 as required to achieve the fire actuated electrical disconnection.

Referring to FIG. 5, the same straight line seen in FIG. 4 is shown at the top and one possible routing around three pivots is shown at the bottom. Two of the three pivots seen in FIG. 3 are identified, and an optional third pivot 58 is shown. The left end of the SMA wire is fixed at point 54. The right side contracts from an initial point to point 68 as the wire is heated. SMA wire is quite strong and flexible and can be relatively thin while still providing significant contraction force.

In FIG. 3, the SMA wire passes around two turning points 56 and 60. In FIG. 4, it is straight and if sufficient space is available within the lock housing, a straight path may be used. Alternatively three points, 56, 58 and 60 (or more) may be used as in FIG. 5. The SMA wire actuation is expected to be used only once during a fire and accordingly, rotating bearings at the turning points or pivots are not required.

SMA wire has sufficient contraction force, strength and flexibility to turn very sharp corners while still pulling the necessary distance to release the connector. However, the turning points or pivots 56 and 60 need to be securely fixed so that they do not move relative to each other. They are preferably all made of metal and are all preferably mounted to the metal mounting plate 40 so that they cannot move even as they are heated. If the pivot points move, the contraction distance will be decreased.

FIG. 3 shows that the back side of the metal mounting plate, which is the side that is adjacent to the fire door, has the bulk of the SMA wire passing along it. As a result, heat passes quickly from the surface of the fire door to this portion of the SMA wire. This design allows the SMA wire to quickly contract and achieve electrical disconnection before significant melting or deformation of the plastic housing occurs.

FIG. 6 shows the connection between the connector 30 and circuit board 34. The ribbon cable 18 extends to the left of FIG. 6. Connector 30 is to the left of center in FIG. 6. The pin header is at the center of FIG. 6, partially obscured by the connector 30 which receives the pins. The circuit board 34 extends from the center to the right side. The force of the SMA wire is exerted to the right in FIG. 6. With the circuit board securely fixed in position, as a force is exerted on the connector 30 by the SMA wire, the connector 30 will slide off the header pins. This motion to the right in FIG. 6 corresponds to motion down in FIGS. 1-4. The SMA wire connection to the connector 30 cannot be seen in FIG. 6.

It will be understood that the contraction of the SMA wire pulls on the connector 30 and that this force will only remove the connector from the header pins on circuit board 34 if that circuit board is securely mounted. Some motion will occur as a result of mounting tolerances for the circuit board and the length of the SMA wire, etc. As a result, the contraction distance of the SMA wire is set to four times, i.e., 0.4" the minimum distance of 0.1" that the connector must move relative to the header pins.

Typically, the heat of a fire is slowly conducted through the fire door such that the SMA wire shrinks and disconnects the electrical connector before plastic has begun to melt or deform significantly.

Figure 10:
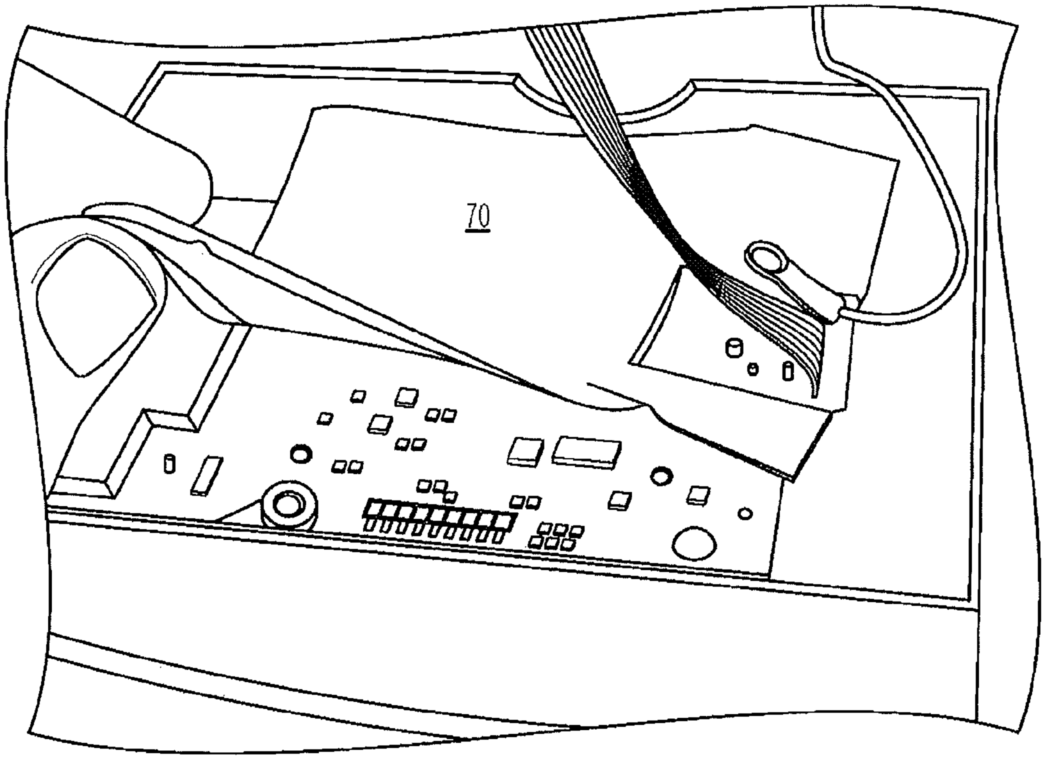
FIG. 10 is a detail view showing an insulation material positioned between the circuit board and the fire door.

However, even the factor of four excess contraction distance described above will not be sufficient if the mounts for the circuit board or the circuit board itself melts before the SMA wire has actuated. To prevent this, the circuit board and or mounts for the circuit board may optionally be insulated with a sheet of insulating material 70 as shown in FIG. 10. The preferred insulating sheet material 70 is aluminum hydroxide, although other insulating materials may be used.

The insulating sheet 70 acts to prevent the circuit board and mounts for the board from melting or deforming as heat is applied. This holds the board in a fixed position so that the force applied by the SMA wire moves the connector and does not move the circuit board.

Figure 9:
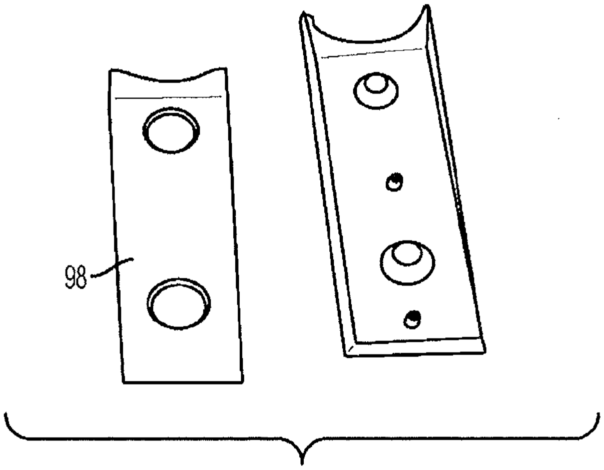
FIG. 9 is a detail view showing an intumescent sheet material positioned between the lock mechanism and the fire door.

In the design described above, the metal mounting plate on the side with component 12 remains attached to the fire door and the housing drops away. The mounting plate 46 on the other side is preferably plastic and is most preferably separated from the surface of the fire door with an intumescent sheet material 98 as shown in FIG. 9.

If a fire occurs on the side of the fire door where lock portion 14 is mounted, the SMA wire on lock portion 12 functions as described to provide electrical disconnection. Bolts 50, 52 heat up, the mounting plate 40 heats up and the lock portion 12, which is held by plastic to the mounting plate 40 will drop away as the plastic mounts melt.

If a fire occurs on the side of the fire door where lock portion 12 is mounted, the heat will pass through bolts 50, 52, which will melt through the plastic mount 46. Although it is optional, and therefore, not shown in FIG. 2, the mounting plate 46 is preferably separated from the surface of the fire door by an intumescent material as shown in FIG. 9. As the heat passes through the fire door, the intumescent material expands, pushing the lock portion 14 away from the fire door.

This provides mechanical disconnection for lock portion 14. The SMA wire will have disconnected portion 12 and as the bolts 50, 52 melt through plastic mount 46, and the intumescent material expands, lock portion 14 drops away. In this way, the lock mechanism achieves both electrical disconnection (necessary so that the electrical connection no longer mechanically tethers the lock) and mechanical disconnection of both sides, regardless of which side of the fire door the fire begins.

The mounting plate and housing on either side of the fire door may be ejected from the surface of the fire door using an intumescent sheet material that expands when exposed to high temperature as illustrated in FIG. 9. Alternatively, gravity alone may be used as the heated metal fasteners release melted plastic connections to those fasteners.

Figure 7:
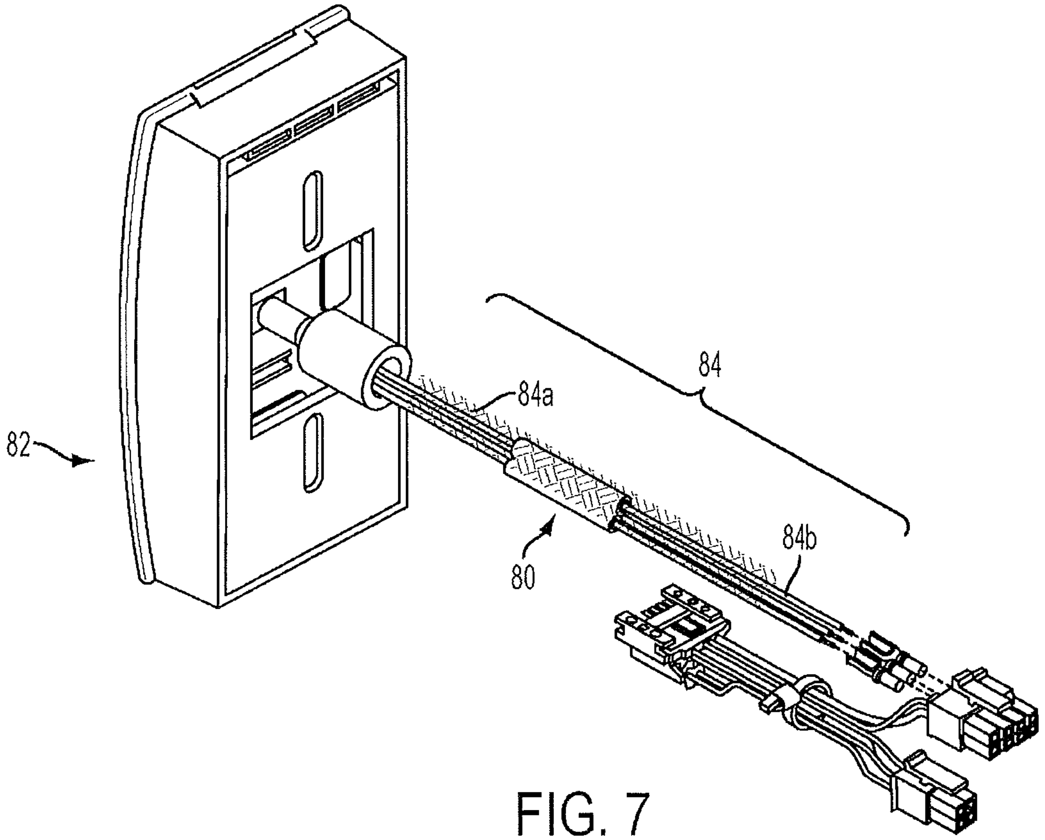
FIG. 7 is a perspective view showing an alternative embodiment of the fire actuated release mechanism in which a solder connector in the wiring melts away to disconnect the wiring.
Figure 8:
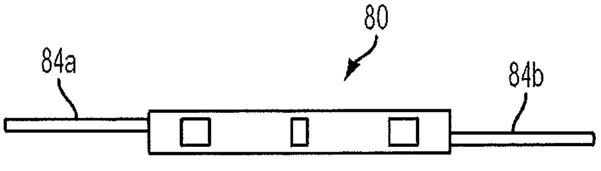
FIG. 8 is a detail view of the solder connector shown in FIG. 7.

FIGS. 7 and 8 show an alternative design for the fire actuated release mechanism of this invention. In this design, meltable solder connectors 80 in each wire are used to disconnect the wiring. In FIG. 7, the electronic lock portion 82 substantially corresponds to the electronic lock portion 12 in FIG. 2. The housing is plastic and the lock 82 must be both mechanically and electrically released from contact with the fire door to prevent ignition of the housing material.

As previously described, the mechanical release relies upon heated metal and melting plastic. The lock portion on the opposite side for this embodiment uses a metal housing and need not drop away, however, this embodiment may be combined with the design described above for lock portion 14.

The lock mechanism 82 is connected to the rest of the lock mechanism with wiring 84, which includes meltable solder connectors 80. As shown in the detail view of FIG. 8, wire **84*a* connects to one end of the connector 80 and wire 84*b*** connects to the opposite end. There may be multiple wires, each of which is provided with a meltable solder connector.

Inside the connector 80 is solder, preferably a low melting temperature solder, which melts to release wire **84*a* from wire 84*b*, thereby allowing the lock mechanism 82 to drop away. This design is best when the solder connectors 80** for each wire can be positioned in close proximity to the heat of the fire door and where the wire run is relatively straight and short.

As shown in FIG. 9, a sheet of intumescent material may be positioned between the mounting plate and the fire door. As the intumescent material is heated, it expands and provides a significant force to drive the mounting plate away from the fire door. The lock mechanism with the ignitable plastic housing and other components then drops away from the fire door to the sill providing the necessary separation between the ignitable plastic components and the heat of the fire door.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An electronic door lock comprising:

a housing mechanically mountable to a first side of a fire door;

wires extending out of the housing and into the fire door;

a circuit board mounted within the housing, the wires being connected to the circuit board;

a fire actuated mechanical release for mechanically releasing the housing from a first side of the fire door when a second side of the fire door is exposed to a fire; and a fire actuated electrical release for electrically and mechanically disconnecting the wires from the circuit board when the second side of the fire door is exposed to a fire;

the mechanical release and electrical release cooperating to release the housing having the circuit board mounted therein from connection to the first side of the fire door and allow the housing having the circuit board mounted therein to move sufficiently away from the fire door to prevent ignition of the housing and circuit board mounted therein when the second side of the fire door is exposed to a fire.

2. The electronic door lock according to claim 1 wherein the housing is not made of metal.

3. The electronic door lock according to claim 1 wherein the housing is made of plastic.

4. The electronic door lock according to claim 1 wherein the electronic door lock further includes an insulating material positioned between the circuit board and the first side of the fire door to limit heat transfer to the circuit board before the fire actuated electrical release has electrically and mechanically disconnected the wires from the circuit board.

5. The electronic door lock according to claim 4 wherein the insulating material is a sheet material including aluminum hydroxide.

6. The electronic door lock according to claim 1 wherein the electronic door lock further includes a metal mounting plate attached to the fire door, the housing is attached to the mounting plate by the fire actuated mechanical release and the fire actuated mechanical release incorporates plastic which melts to release the housing and allow the housing to drop away from the mounting plate and fire door.

7. The electronic door lock according to claim 1 further including an intumescent sheet material which expands to assist the housing in moving sufficiently away from the fire door to prevent ignition of any components of the electronic door lock when the second side of the fire door is exposed to a fire.

8. The electronic door lock according to claim 1 wherein the housing moves away from the fire door under the influence of gravity to drop away from the fire door and prevent ignition of any components of the electronic door lock when the second side of the fire door is exposed to a fire.

9. The electronic door lock according to claim 1 wherein the fire actuated electrical release for electrically and mechanically disconnecting wires from the circuit board includes a plurality of solder connectors connected between the wiring and the circuit board, the solder connectors melting when heated to electrically and mechanically disconnect the wires from the circuit board.

10. An electronic door lock comprising:

a housing mechanically mountable to a first side of a fire door;

wires extending out of the housing and into the fire door, the wires are connected to an electrical connector for the wires;

a circuit board mounted within the housing, the wires being connected to the circuit board, the circuit board includes an electrical connector for the circuit board, the electrical connector for the circuit board and the electrical connector for the wires being mating connectors electrically connected together when the electronic door lock is in use;

a fire actuated mechanical release for mechanically releasing the housing from a first side of the fire door when a second side of the fire door is exposed to a fire;

a fire actuated electrical release for electrically and mechanically disconnecting the wires from the circuit board when the second side of the fire door is exposed to a fire, the fire actuated electrical release includes a shape memory alloy that changes shape when exposed to the heat of a fire; and the mechanical release and electrical release cooperating to release the housing from connection to the first side of the fire door and allow the housing to move sufficiently away from the fire door to prevent ignition of the housing and components therein when the second side of the fire door is exposed to a fire, whereby the shape memory alloy is connected to the electrical connector for the wires and disconnects the electrical connector for the wires from the electrical connector for the circuit board when the shape memory alloy actuator is exposed to heat as the second side of the fire door is exposed to said fire.

11. The electronic door lock according to claim 10 wherein the electrical connector for the circuit board includes a plurality of pins arranged as a pin header and the fire actuated electrical release provides a force parallel to the pins of the pin header to disconnect the electrical connector for the wires from the electrical connector for the circuit board.

12. The electronic door lock according to claim 11 wherein the plurality of pins are oriented parallel to the circuit board.

13. The electronic door lock according to claim 10 wherein the shape memory alloy is formed as a wire.

14. The electronic door lock according to claim 13 wherein the shape memory alloy wire includes first and second ends, the first end being fixed relative to the housing of the electronic door lock and the second end being connected to the electrical connector for the wires.

15. The electronic door lock according to claim 13 wherein the shape memory alloy wire is routed around at least one fixed point.

16. The electronic door lock according to claim 15 wherein the least one fixed point is a stud.

17. The electronic door lock according to claim 16 wherein the stud is a metal stud.

18. The electronic door lock according to claim 15 wherein the electronic door lock further includes a mounting plate, the housing is attached to the mounting plate and the at least one fixed point is an edge of the mounting plate.

19. The electronic door lock according to claim 13 wherein the shape memory alloy wire has a length greater than a maximum dimension of the housing and the shape memory alloy wire is routed around a plurality of fixed points.

20. The electronic door lock according to claim 10 wherein the electronic door lock further includes a mounting plate attached to the fire door, the housing is attached to the mounting plate and the shape memory alloy is at least partially located between the mounting plate and the fire door to receive heat from the fire door and release the electrical connector for the wires from the electrical connector for the circuit board.

* * * * *